United States Patent [19]

MacLeod et al.

[11] Patent Number: 5,304,276
[45] Date of Patent: Apr. 19, 1994

[54] METHOD AND APPARATUS FOR RECLAIMING GYPSUM FROM WASTE WALLBOARD

[75] Inventors: Bruce C. MacLeod, Vancouver; Keith A. Burley, Surrey, both of Canada

[73] Assignee: G. P. Research Ltd., Canada

[21] Appl. No.: 962,580

[22] PCT Filed: Jan. 8, 1991

[86] PCT No.: PCT/CA91/00006

§ 371 Date: Jan. 21, 1993

§ 102(e) Date: Jan. 21, 1993

[87] PCT Pub. No.: WO92/00152

PCT Pub. Date: Jan. 9, 1992

[51] Int. Cl.$^5$ .................................................. B32B 35/00
[52] U.S. Cl. ........................................ 156/344; 156/94; 156/584; 264/37
[58] Field of Search .............. 156/94, 344, 584; 264/37

[56] References Cited

U.S. PATENT DOCUMENTS

| | | | |
|---|---|---|---|
| 1,960,399 | 5/1934 | Taylor | 100/170 |
| 2,156,311 | 5/1939 | Schuh | 162/154 |
| 4,122,457 | 10/1978 | Erikson et al. | 346/75 |
| 4,130,057 | 12/1978 | List et al. | 101/148 |
| 5,100,063 | 3/1992 | Bauer | 241/DIG. 38 X |

FOREIGN PATENT DOCUMENTS

| | | | |
|---|---|---|---|
| 1166138 | 4/1984 | Canada. | |
| 59-142115 | 8/1984 | Japan | 156/344 |
| 63-202409 | 8/1988 | Japan | 156/344 |
| 994239 | 6/1965 | United Kingdom | 100/160 |

*Primary Examiner*—David A. Simmons
*Assistant Examiner*—Mark A. Osele
*Attorney, Agent, or Firm*—Marger, Johnson, McCollom & Stolowitz

[57] ABSTRACT

This invention pertains to a method and apparatus for reclaiming gypsum from waste paper laminated gypsum wallboard. The invention is directed to an apparatus that is useful for separating paper laminate from gypsum wallboard comprising: a roller and a plate spatially disposed from the roller. The aperture between the roller and the plate is sized to be slightly less than the wallboard thickness thereby creating a fracturing action between the gypsum and the paper laminate. The first roller can be driven by a power source. A roller can be substituted for the plate and can be undriven or driven independently of the first roller.

16 Claims, 3 Drawing Sheets

METHOD AND APPARATUS FOR RECLAIMING GYPSUM FROM WASTE WALLBOARD

FIELD OF THE INVENTION

This invention pertains to a method and apparatus for reclaiming gypsum from waste paper laminate gypsum wallboard.

BACKGROUND OF THE INVENTION

Gypsum wallboard, comprising a gypsum core and planar paper outer surfaces, is widely and extensively used by the western world building construction industry in the construction of residential and commercial buildings. The gypsum wallboard is typically supplied in half-inch five-eights inch or three-quarter inch thick sheets measuring 4 feet by 8 feet in width and length. The entire wallboard panel can be used in most situations. However, in some situations, only a portion of the wallboard panel can be used, the extraneous portions being cut away by the wallboard installer. Those cut-away parts cannot be used elsewhere. As a consequence, in any building construction or renovation project, a substantial amount of waste gypsum wallboard is generated. As much as 10 percent of the gypsum wallboard panels supplied to the construction site may end up as waste gypsum wallboard.

This waste wallboard has, in the past, created disposal problems in the Greater Vancouver Regional District in British Columbia, Canada, because when the waste wallboard is buried in a conventional waste landfill operation, obnoxious hydrogen sulfide gas and soil leachate are generated. The generated obnoxious gas odour problem has made it necessary to initiate a program of special waste wallboard sorting, stockpiling, storage, and materials handling to facilitate ocean dumping. Currently, in the Greater Vancouver Regional District of British Columbia, approximately 20,000 tons per year of gypsum wallboard waste material is dumped in the Pacific Ocean. This is an expensive waste disposal procedure. It may also lead ultimately to ocean pollution.

The gypsum of the wallboard scraps is valuable and could be reused. However, a serious problem with waste gypsum wallboard is that the paper outer layers remain bonded to the gypsum core and are not readily removable. It is difficult to efficiently remove the paper outer layers from the gypsum core without leaving a substantial amount of paper residue on the gypsum. Gypsum wallboard manufacturers have, to date, been unable to recycle any more than about one percent of the total waste wallboard production because paper contamination of the finished product must be minimized. Such manufacturers currently use a combination of hammer mills and screening plants, which combination, under ideal conditions, is capable of removing about 65 percent of the paper. This process requires considerable energy consumption and creates unwanted airborne gypsum dust.

DE-A-27,09,975, Sep. 14, 1978, discloses a horizontal pair of roughened rollers 28 and 30 which are adjustable in angle to provide a shearing action on a plate 20. No delamination of exterior layers from a core is disclosed.

SUMMARY OF THE INVENTION

The invention is directed to an apparatus that is useful for separating paper laminate from gypsum wallboard comprising: (a) a first roller means; and (b) a second means spatially disposed from the first roller means. The first and/or second means can be driven together or independently from the same or independent power source(s).

The second means can be a roller. In the apparatus, the first and second roller means may be parallel axially mounted parallel cylindrical rollers. The surface areas of the first and second rollers may be smooth.

An apparatus for separating paper laminate from paper laminated gypsum wallboard comprising: (a) a first roller means; (b) a second means spatially disposed from the first roller means to create an aperture which is slightly less than the thickness of the wallboard to be treated; and (c) power means for moving the first roller means relative to the spatially disposed second means as the wallboard is passed through the aperture.

The first and second means can be parallel axially mounted cylindrical rollers. The first roller means can be driven by the power means. The first and second roller means can be driven by the power means but each roller means is rotatable at an independent speed. The first and second roller means can be driven independently by separate power means. The surface areas of the first and second rollers can be smooth or roughened. The first and second rollers can be mounted on steady bearings and can be held in place by back-up rollers. A second pair of rollers can be mounted in tandem with the first and second rollers and a third pair of rollers can be mounted in tandem with the first and second pairs of rollers. The apertures between the successive pairs of rollers can be slightly less relative to the apertures of the preceding pairs of rollers. Five pairs of rollers can mounted in succession, the centre line of the apertures between each successive pair of rollers being aligned with one another, and the widths of the apertures between the successive roller pairs being respectively less in succession along the sequence of roller pairs. The second means can be a broad planar hard surface.

A process of removing paper laminate from paper laminate gypsum core wallboard comprising passing the wallboard through an aperture, the aperture being sized to be slightly less than the cross-sectional dimension of the wallboard so that the aperture fractures the bond between the paper laminate and the gypsum core and generates a wave form action in the paper laminate, thereby inducing the paper laminate to separate from the gypsum core.

The aperture can be created by a pair of parallel spaced rollers, one of the rollers being powered, the other roller being unpowered. Each roller can be independently powered so that each roller can rotate at an independent speed.

DRAWINGS

In drawings which illustrate specific embodiments of the invention but which should not be construed as restricting the spirit or scope of the invention in any way:

DETAILED DESCRIPTION OF SPECIFIC EMBODIMENTS OF THE INVENTION

Figure 1:
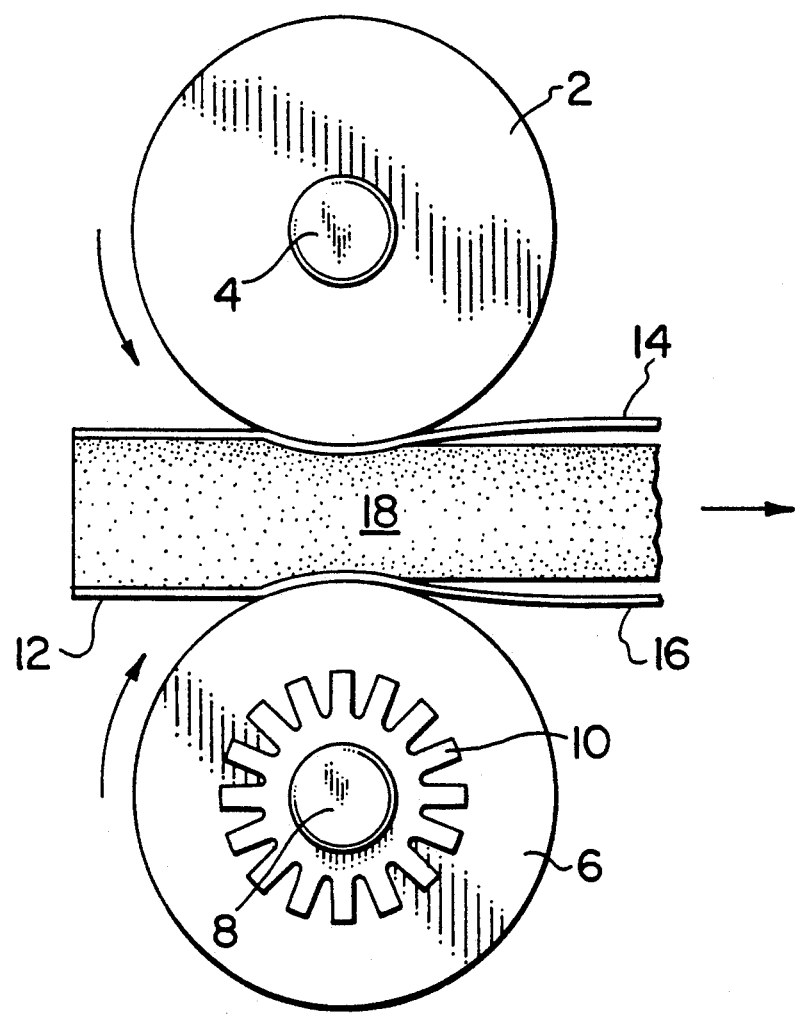
FIG. 1 illustrates a side elevation view of a twin roller system used to separate the paper laminates from each side of a gypsum core.

FIG. 1 of the drawings illustrates a side elevation view of a twin cylindrical roller system of the invention as it is used to separate the paper laminates from each side of the gypsum core of a typical gypsum wallboard. As depicted in FIG. 1, the upper roller 2 is rotatably mounted on a shaft 4. The top roller 2 in one embodiment is non-driven. The lower roller 6 is also rotatably mounted on a shaft 8, which has a drive gear 10 mounted thereon. The lower roller 6 is driven by a suitable drive means via gear 10 in a counterclockwise direction, as indicated by the directional arrow. As can be seen in FIG. 1, the non-driven roller 2 and the driven roller 6 are spaced apart so that they have an aperture between them which is slightly less than the thickness of the waste wallboard product 12. The rollers 2 and 6 compress the exterior regions of the wallboard product 12 slightly, and by means of a wave action as described herein, cause the two paper laminates 14 and 16 to separate from each side of the gypsum core 18.

After undergoing the foregoing procedure, the respective paper laminates 14 and 16 may be easily separated from the gypsum core 18 with minimum gypsum residue on the paper. It has been found that the wave form action created in the wallboard by the pair of rollers 2 and 6 does not crush or crumble the gypsum core 18, but generally leaves the core 18 in one piece for easy handling, and minimum waste.

In an alternative embodiment, both rollers 2 and 6 may be driven, either independently from separate power sources, or from a common power source with a slip clutch between the two drive mechanisms. It is helpful to separation action that the two rollers can rotate at independent speeds to accommodate waves and imperfections in the wallboard 12. Independent variable speed drive motors can be used which can be accelerated or slowed down as required in order to maximize the paper laminate separation action.

Figure 2:
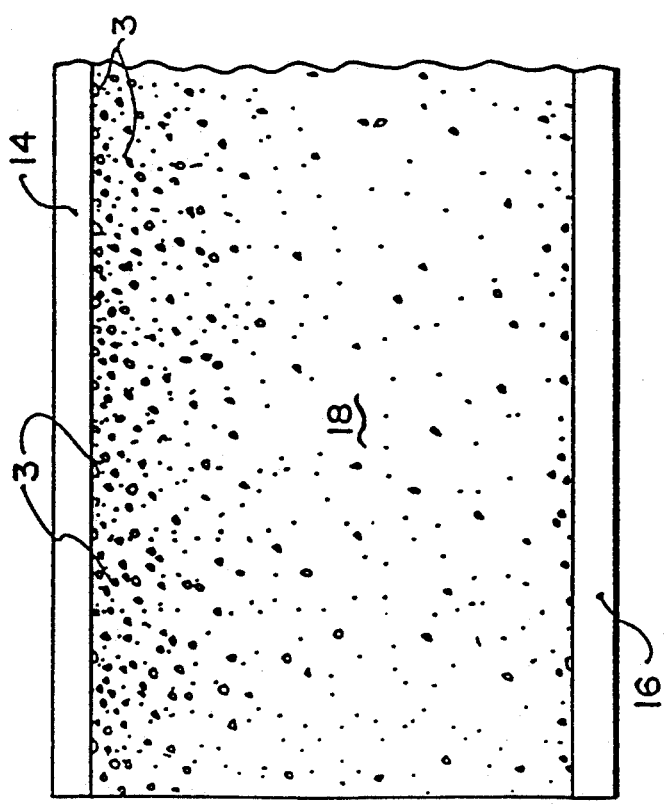
FIG. 2 illustrates a cross-sectional side view of a typical gypsum wallboard construction.

FIG. 2 of the drawings illustrates a crosssectional side view of a typical gypsum wallboard construction. The upper paper sheet 14 and the lower paper sheet 16 encase the gypsum core 18. Typically, the paper laminate 14 is the back-face of the wallboard while the paper laminate 16 is the front face of the wallboard. As can be seen in FIG. 2, which is exaggerated for emphasis, a large number of discrete air bubbles 20 are entrapped in the core 18 during the formation of the gypsum wallboard. Since the gypsum wallboard is normally formed along a horizontal production line, a majority of the entrapped air bubbles migrate to the top of the core 18 and come to rest in the region adjacent the rear paper laminate 14. The bubbles 20, and the uneven distribution thereof, add a variability factor to the waste recovery process and thus demand that the opening (aperture) between the roller pair 2 and 6 must be variable in width. Likewise, roller speeds must be independent to accommodate the imperfections in the wallboard. Variations of up to 0.75 mm (30/1000th of an inch) are possible in typical wallboard manufacture.

Figure 3:
FIG. 3 illustrates an end view of a conventional gypsum wallboard.

FIG. 3 illustrates an end view of a conventional gypsum wallboard, and in particular illustrates conventional tapered edges 22 and 24. These tapered edges 22 and 24 are formed in the wallboard to provide room for finishing plaster and tape to be applied to adjoining wallboard panels, thereby obscuring the edges of the panels. To maximize efficiency in waste paper removal from the waste gypsum wallboard, we have found that it is preferable to cut away the tapered edges 22 and 24 before feeding the waste gypsum wallboard into the rollers 2 and 6.

A problem we have discovered with narrower diameter rollers is that when such rollers extend over a distance of 4 feet or more, in order to accommodate the width of a standard wallboard, the interior regions of the roller may slightly warp or bow away from the wallboard, which means that less compression force is applied to the interior regions of the wallboard, compared to the outer regions of the rollers. In order to maintain a uniform compression force across the span of the rollers, and the wallboard face, we have found that it may be necessary to utilize steady bearing rollers, which are mounted on the sides of the rollers remote from the wallboard compressing side of the rollers. Such steady bearing rollers have built-in give and help minimize the bowing that may take place in narrow diameter long rollers.

Alternative systems for maintaining linear dimension stability of small diameter rollers can be designed. For example, it may be feasible to mount a narrow diameter roller against a pair of reinforcing rollers abutting the side of the roller opposite the compression face of the roller. The pair of reinforcing rollers serve to cradle the operational roller as it rotates during the wallboard separation process and minimizes bowing. Such an arrangement is illustrated in side elevation view in FIG. 4 of the drawings. Top roller 2 is backed up by rollers 21 and 23 while bottom roller 6 is backed up by rollers 25 and 27. The effect is to increase net roller thickness and minimize bowing.

In certain situations, it may be advantageous to utilize roller pairs in series with one another in order to maximize paper laminate separation action. Two or more pairs of rollers may be utilized for this purpose. The aperture between the downstream pair of rollers may be varied relative to the aperture between the upstream rollers, in order to enhance paper laminate separation. Such an arrangement is illustrated in side elevation view in FIG. 5. The first pair of rollers 2 and 6 is set with a specified aperture. The second following pair of rollers 26 and 28 can be set with the same or a slightly narrower aperture, depending upon results to be obtained.

Figure 6:
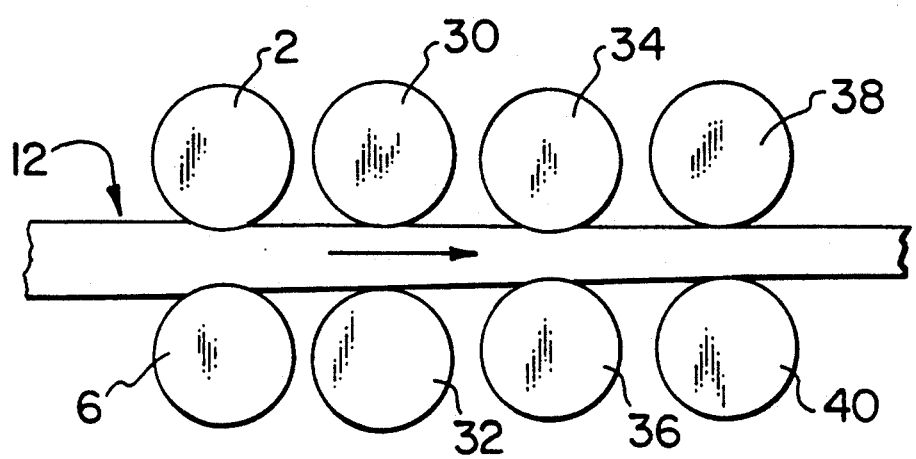
FIG. 6 illustrates a side elevation view of an alternative embodiment of the invention showing the use of series oriented multiple rollers in opposition to one another.

FIG. 6 illustrates a side elevation view of an alternative embodiment of the invention utilizing four pairs of rollers in series. Specifically, the wallboard 12 is passed through a succession of opposed pairs of rollers, the aperture between the successive opposing pairs of rollers being set at slightly reduced dimensions in succession. As illustrated in FIG. 6, a first pair of opposing rollers 2 and 6 might be set, for example, so that the aperture between the two rollers is 0.25 mm (10/1000 of an inch) less than 12.5 mm (one-half an inch), presuming that the wallboard 12 is 12.5 mm (half an inch) in thickness. Downstream, the opposing pair of rollers 30 and 32 would be set to have an aperture of 0.5 mm (20/1000 of an inch) less than 12.5 mm (one-half an inch). Subsequently, opposing roller pairs 34 and 36 would be set to have an aperture of 0.75 mm (30/1000 of an inch). Lastly, opposing roller pairs 38 and 40 would be set to have an aperture between them of 1 mm (40/1000 of an inch) less than 12.5 mm (half an inch). It will be recognized that more rollers can be added to the sequence, with the apertures set accordingly. It will also be recognized that the aperture between the successive pairs of rollers need not necessarily be set in increments of 0.25 mm (10/1000 of an inch) difference. This series roller pair system has considerable flexibility and ensures that appropriate efficient paper-gypsum separation takes place. Trial and error for any particular wallboard can be conducted to maximize performance.

The function of the multiple roller pair sequence is to enable the efficient separation of the paper laminate layer from the gypsum wallboard, while at the same time handling production tolerances in wallboard thickness from the manufacturer. The multiple roller pair sequence overcomes the necessity to use space adjustable steady bearings which are usually required when only a single pair of rollers are used. Adjustable steady bearings can be expensive. Moreover, as wear occurs, the efficiency of the paper-gypsum delamination capability of the roller pair decreases. The use of multiple pairs of rollers in succession, with successively narrower apertures between the successive pairs of rollers, ensures that even with reasonably wide manufacturing wallboard thickness tolerances, lamination of the upper and lower paper faces will occur efficiency at some point as the wallboard is passed through the succession of roller pairs. If effective separation does not occur at one point, then one or more other pairs downstream will ensure separation.

Figure 7:
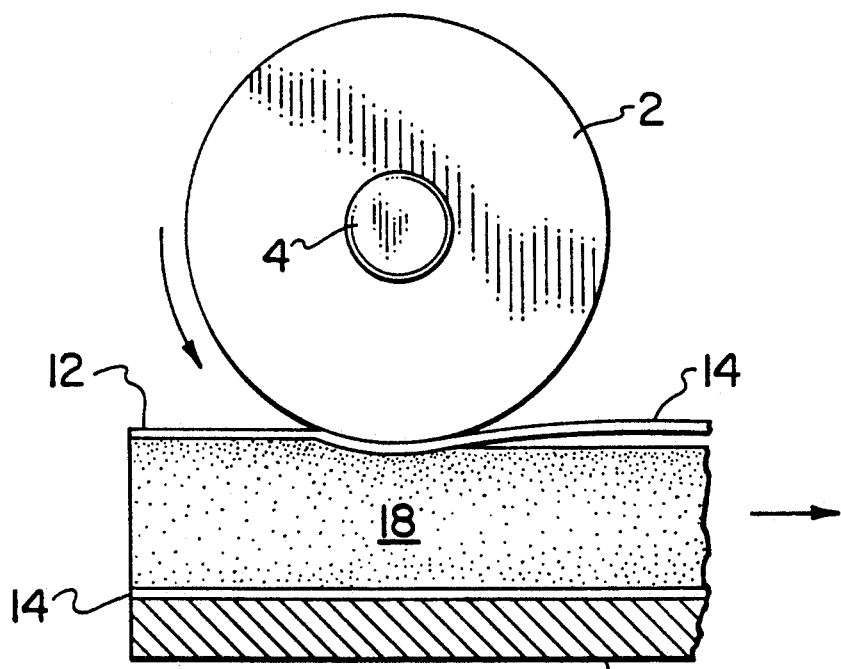
FIG. 7 illustrates a side elevation view of an alternative embodiment of the invention utilizing a roller on one side of the wallboard and a fixed solid plate on the opposite side of the wallboard.

FIG. 7 illustrates a side elevation view of an alternative embodiment of the invention, wherein only one roller is used and delamination of the top paper layer occurs. In certain instances, it may not be advantageous or desirable to pass the wallboard to be laminated through one or more pairs of opposing rollers. In the embodiment illustrated in FIG. 7, the roller 2 delaminates only the upper paper layer 14, as the wallboard 12 is passed under the roller 2 in the direction of the arrow indicated in FIG. 7. A rigid planar metal plate 42 is located on the opposite side (underside) of the wallboard 12. As the roller 2 is passed over the wallboard 12, the upper paper layer 14 is separated from the gypsum core 18. It will be understood that the rigid support 42 can be a large planar steel plate, a flat concrete floor, a strong table surface, or some other suitable surface on which the wallboard can be placed. Once the roller 2 is passed along one side of the wallboard 12, and thereby delaminates paper layer 14, the wallboard 12 is then inverted and the roller 2 is then passed over the opposite side. The bottom layer of paper is then delaminated once the wallboard is inverted and the roller 2 is run over that side of the wallboard 12.

While this embodiment of the invention is illustrated in FIG. 7, it may take twice as long as a roller pair to delaminate the paper 14 from the gypsum core 18, nevertheless in certain situations, the increased length of time may not be a handicap due to location considerations, equipment considerations, or the like. It may be economical in the long run to simply delaminate one paper layer first, and then invert the wallboard and delaminate the opposite paper second, notwithstanding that the roller 2 must be passed first along one side of the wallboard 12, and then along the opposite side after the wallboard is inverted.

Figure 4:
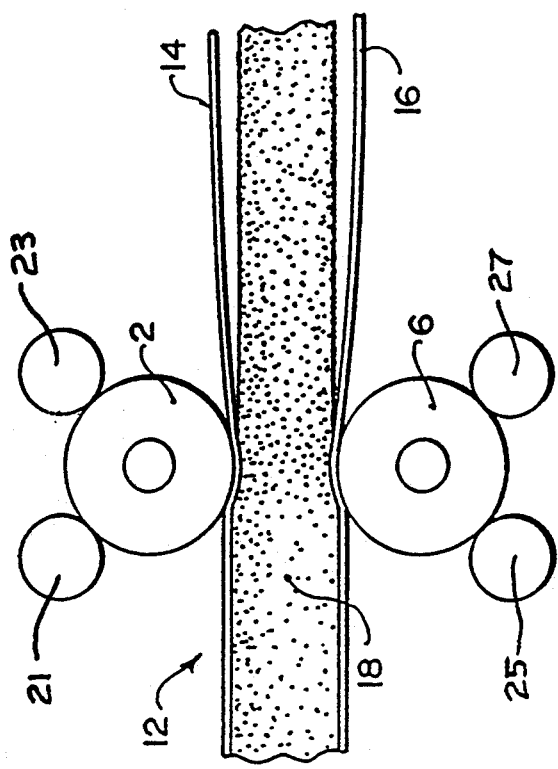
FIG. 4 illustrates a side elevation view of gypsum wallboard apparatus comprising a pair of main rollers reinforced respectively by a pair of back-up rollers abutting the respective sides of the roller opposite the compression faces of the main rollers.
Figure 5:
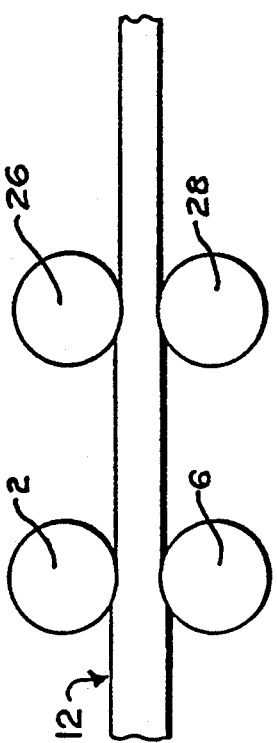
FIG. 5 illustrates a side elevation view of a gypsum wallboard separation apparatus comprising a first pair of roller and a second pair of rollers mounted in tandem with the first pair of rollers.
Figure 8:
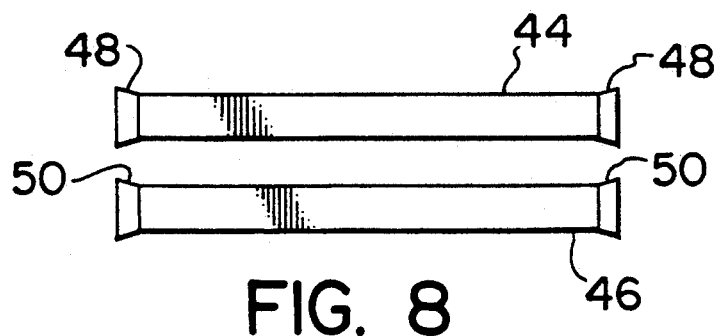
FIG. 8 illustrates a front view of a spool-type roller pair adapted to separate the paper from the tapered edges of a wallboard piece.

FIG. 8 illustrates a front view of a pair of "spool-shape" rollers 44 and 46 which are installed downstream from the roller pair 2,6 shown in FIGS. 2 and 4, or the dual roller pairs 2,6 and 26,28 shown in FIG. 5, or the quadruplicate roller pairs 2,6; 30,32; 34,36; and 38,40 shown in FIG. 6. The function of the conical shaped outer ends 48 and 50 of the rollers shown in FIG. 8 is to apply a specific force to the tapered edges 22 and 24 of the wallboard shown in FIG. 3. When this spool-shape roller pair 44 and 46 is used, paper on the tapered edges 22 and 24 can be separated from the gypsum 18. It is thus not necessary to trim away the tapered edges 22 and 24 from the wallboard pieces before sending them to a cylindrical roller pair 2,6 as shown, for example, in FIG. 1. It will be recognized that one spool-like roller 44 can be paired with a planar surface below and still obtain paper-gypsum separation from the tapered edges 22 and 24.

EXAMPLE

Research and development on the problem of completely removing the paper from waste gypsum wallboard was commenced using various techniques. Methods which were initially tried but later discarded were: mass crushing and screening, localized impact crushing, hydraulic shearing, abrasive planing, burning, cold and hot water separation by agitation and water jet peeling. It was found that all of these processes had assorted disadvantages such as difficult handling and sorting of material, dust problems, high energy consumption, and production of unmanageable by-products.

After considerable experimentation and many disappointments with other techniques, we discovered that a pair of smooth rollers of similar size diameters, with one roller being driven and the other following, when set at an appropriate roller aperture size slightly less than wallboard thickness, compressed and removed the face and back paper sheets of waste and new gypsum wallboard efficiently and consistently with minimum gypsum residue left on the separated paper. Thus most of the gypsum core was harvested while the separated paper layers with running gypsum residue were readily disposable.

We discovered that the rollers acted by fracturing the crystalline particles of gypsum which bonded the paper to the core gypsum material. We also discovered that the paper separation process was induced by a "wave-like" motion which was generated ahead of the roller pair. This motion appeared to compress the bonding particles into the adjacent entrapped air pockets, and at the same time lifted the paper, thereby creating a release of the paper from the gypsum core.

By experimentation, we have established several critical parameters and properties that the rollers should have:

1. The rollers should have an aperture set at a dimension slightly smaller than the wallboard thickness. If the aperture is too small, the core will fracture along the centre line of the core, thereby rendering the separation process useless because about half the gypsum core remains adhered to each paper sheet.

2. The roller aperture should be constantly adjustable. Since the air content of the gypsum core material and the thickness of the wallboard varies from producer to producer and even from one day's production to the next, no set aperture can be used.

3. The rollers should be constructed of sufficiently strong material, e.g. steel, to mimimize roller flexing and bowing due to the high compressive strength of the wallboard, and the forces that must be used to achieve separation.

4. The span of the rollers can be effectively increased by using "steady bearings", which assist in preventing the rollers from bowing.

5. The roller surfaces should preferably be smooth to create a consistent force across the face of the wallboard and induce a wave-like paper separation motion in the wallboard.

6. Rollers with knurled surfaces can be somewhat effective but are less efficient due to locational debonding between the paper and the core.

7. In certain situations, it may be found that both rollers should not be driven in order to achieve best results. In this situation, one should be driven and the other should follow in order to accommodate different wallboard surface characteristics and thicknesses. In typical wallboard, the air bubbles are more concentrated on the backside of the wallboard. Also, there is generally damage caused to the wallboard surface during installation and scrap removal. These differences are variable and may cause the rollers to speed up and slow down together or separately in relationship to the wallboard area travelled over by the rollers. In other situations, it may be found that both rollers can be driven with a limited slip device, or friction clutch device, or by two separate motors, in order to obtain optimum paper separation action.

8. For typical 12.5 mm or 15.0 mm ($\frac{1}{2}$" or $\frac{1}{2}$") wallboard, a pair of rollers of 38 mm (1$\frac{1}{2}$") diameter appears to create the best wave motion for core-paper separation. Experiments have been conducted with 12.5 mm ($\frac{1}{2}$") diameter to 30 cm (12") diameter rollers but roller sizes in the 25.4 mm to 10 cm (1" to 4") diameter range appear to be most successful.

9. The rollers can be used in tandem for treating running 15 mm to 12.5 mm ($\frac{5}{8}$" and $\frac{1}{2}$") wallboard or can be used adjacent to one another for hand or machine sorting.

10. Using a hand-cranked prototype, roller rotation speeds in the range of 60 to 100 rpm have been found to be suitable. However, under production conditions, we do not foresee any problem in operating the rollers at about 1,000 rpm. The higher rotational speeds would increase production capacity. As a general rule, both rollers should be independently driven for higher production speeds.

Process Operation Characteristics

In preparing the waste wallboard for separation, we have found that it is more efficient to remove the factory tapered edge (which is of less thickness than the interior) by cutting prior to separation. Multiple sets of rolls with progressively smaller openings can be used to compress the board and its factory tapered edge.

Use of the subject process and apparatus enables removal of 100 percent of the front and back paper from the gypsum core material. The process and apparatus of the invention should allow virtually all of the typical 10 percent of construction wallboard waste to be recycled. The process and apparatus are energy efficient to operate. The system creates very little dust or noise pollution.

If both rollers are driven, we have determined that there is a good possibility that binding problems occur, gear and motor wear problems ensue, and operation is not as trouble-free as is the case when only one of the rollers is driven. An exception is when each roller is driven independently or there is a slip clutch between the rollers so that they can deal with individual wallboard imperfections. Having one drive roller, and one follower roller, appears to be best suited for accommodating the variations in consistency and thickness in various wallboards, at relatively low speedws. At higher speeds, two driven rollers may be advantageous provided they can travel at independent speeds when necessary.

We have also determined that it is inconsequential whether the side of the wallboard with the concentration of air bubbles faces up or down, or faces the drive roller than the follower roller. Either orientation appears to work equally well. However, if the aperture between the two rollers is set too wide so that a suitable compression force on the wallboard is not obtained, complete separation of the paper laminate on the concentrated bubble side of the core appears to take place, but there is not consistent separation of the paper laminate on the opposite side. On the other hand, if the aperture between the two rollers is set too narrow, undue bite occurs on the two faces of the wallboard and the gypsum core tends to fracture approximately equidistant between the two paper laminates. This is unacceptable because gypsum contaminated paper is obtained and no paper free gypsum core is created.

Smaller diameter rollers are preferred because a stronger, more efficient paper-gypsum separating wave action is generated by small rollers. If larger rollers are used, it appears that insufficient concentrated localized bite between the rollers is obtained, and the necessary wave action for paper laminate separation does not occur, or is not optimum. Larger rollers also tend to leave too much gypsum residue on the paper laminates, even though there may be separation of the paper from the gypsum core. Since the separated paper laminates are discarded, it is advantageous for efficiency and ecomony reasons that as little gypsum as possible remains on the separated paper. With smaller diameter rollers, we have found that less than 3 percent gypsum residue remains on the separated paper laminates.

We have also observed, during operation of the prototype, that the wave action that is created in the interior of the gypsum wallboard as the wallboard passes through the aperture between the two rollers, tends to cause the paper laminate to hop or skip in small visible increments. This action appears to promote a separation action between the paper laminates and the gypsum core.

It has also been determined that if too high a compression force is exerted by the rollers on the gypsum wallboard, the separated paper laminate tends to curl rearwardly. This can cause problems by the paper becoming caught up in the upstream side of the roller. In such cases, it may be necessary to install blades or foils which prevent the paper from curling backwardly and being caught up in the rollers. The ideal operating situation appears to occur where sufficient compression forces are applied to achieve separation and the separated wallboard paper laminate tends to remain relatively linear, with the core an integral entity in itself. In this fashion, maximum gypsum recovery is achieved, and the generation of airborne gypsum dust is minimized because it is retained between the linear paper laminates.

We claim:

1. A method for separating paper laminate from paper laminated gypsum core wallboard having a first paper laminate side and a second paper laminate side opposite the first paper laminate side sandwiching the gypsum core between the two paper laminates, comprising:
   passing the paper laminated gypsum core wallboard through an aperture comprising:
   (a) a first roller means which contacts the first paper laminate side of the wall board;
   (b) a second means spatially disposed from the first roller means to create an aperture which is less than the thickness of the wallboard to be treated, said second means contacting the second paper laminate side of the wallboard; and
   (c) rotating the first roller means relative to the spatially disposed second means as the wallboard is passed through the aperture, to thereby impart a compression force on the first paper laminate side, said force crushing an interface between the first paper laminate side and an adjacent portion of the gypsum core to thereby cause the first paper laminate to separate from the gypsum core while leaving the gypsum core substantially intact.

2. A method as defined in claim 1 wherein the first and second means are parallel axially mounted cylindrical rollers which together exert a compression force on the first and second paper laminates and cause the first and second paper laminates to separate from adjacent portions of the gypsum core while leaving the gypsum core substantially intact.

3. A method as defined in claim 1 wherein the first roller means is driven by a power means.

4. A method as defined in claim 2 wherein the first and second roller means are driven by a power means but each roller means is rotatable at an independent speed.

5. A method as defined in claim 4 wherein the first and second roller means are driven independently by separate power means.

6. A method as defined in claim 2 wherein the surface areas of the first and second rollers are smooth.

7. A method as defined in claim 2 wherein the surfaces of the first and second rollers are roughened.

8. A method as defined in claim 2 wherein the first and second rollers are held in place by back-up rollers.

9. A method as defined in claim 2 wherein a second pair of rollers is mounted in tandem with the first and second rollers.

10. A method as defined in claim 9 wherein a third pair of rollers is mounted in tandem with the first and second pairs of rollers.

11. A method as defined in claim 10 wherein the apertures between each successive pair of rollers is slightly less relative to the aperture of the preceding pair of rollers.

12. A method as defined in claim 2 wherein five pairs of rollers are mounted in succession, the centre line of the apertures between each successive pair of rollers being aligned with one another, and the widths of the apertures between the successive roller pairs being respectively less in succession along the sequence of roller pairs.

13. A method as defined in claim 1 wherein the second means is a broad planar hard surface.

14. A process of removing paper laminate from paper laminate gypsum core wallboard constructed of a first paper laminate and a second paper laminate which sandwich the gypsum core between them, comprising passing the wallboard through an aperture, the aperture being sized to be slightly less than the cross-sectional dimension of the wallboard so that the aperture fractures respective bonds between the first paper laminate and the gypsum core, and the second paper laminate and the gypsum core thereby inducing the first and second paper laminates to separate from the gypsum core, while leaving the core substantially intact.

15. A method as defined in claim 14 wherein the aperture is created by a pair of spaced elongated parallel rollers, one of the rollers being powered; the other roller being unpowered.

16. A method as defined in claim 14 wherein the aperture is created by a pair of spaced elongated parallel rollers and wherein each roller is independently powered so that each roller can rotate at an independent speed.

* * * * *